(12) United States Patent
Martiushev et al.

(10) Patent No.: US 11,898,426 B2
(45) Date of Patent: Feb. 13, 2024

(54) SUBMERSIBLE ELECTRIC MOTOR WITH A SYSTEM FOR MAINTAINING A CONSTANT POSITIVE PRESSURE

(71) Applicant: Joint Stock Company "Novomet-Perm", g. Perm (RU)

(72) Inventors: Danila Nikolayevich Martiushev, g. Perm (RU); Natalya Anatolevna Lykova, g. Perm (RU); Timofej Rinatovich Motygullin, g. Perm (RU); Stepan Konstantinovich Kozlov, g. Perm (RU); Dmitriy Alekseevich Shevtsov, g. Perm (RU); Maksim Olegovich Perelman, g. Perm (RU); Evgeniy Vyacheslavovich Poshvin, g. Perm (RU)

(73) Assignee: Joint Stock Company "Novomet-Perm", g. Perm (RU)

( * ) Notice: Subject to any disclaimer, the term of this patent is extended or adjusted under 35 U.S.C. 154(b) by 0 days.

(21) Appl. No.: 17/607,668

(22) PCT Filed: Jul. 27, 2020

(86) PCT No.: PCT/RU2020/000395
§ 371 (c)(1),
(2) Date: Oct. 29, 2021

(87) PCT Pub. No.: WO2021/021001
PCT Pub. Date: Feb. 4, 2021

(65) Prior Publication Data
US 2023/0193730 A1 Jun. 22, 2023

(30) Foreign Application Priority Data

Aug. 1, 2019 (RU) ............................ RU2019124783

(51) Int. Cl.
*E21B 43/12* (2006.01)
*F04D 13/08* (2006.01)
(Continued)

(52) U.S. Cl.
CPC .......... *E21B 43/128* (2013.01); *F04D 13/086* (2013.01); *F04D 13/10* (2013.01); *H02K 5/132* (2013.01); *F05B 2240/57* (2013.01)

(58) Field of Classification Search
CPC ...... E21B 43/128; E21B 4/003; E21B 47/008; F04D 13/10; F04D 13/062; F04D 13/086; F04D 29/108; F04D 29/128
See application file for complete search history.

(56) References Cited

U.S. PATENT DOCUMENTS

| 3,301,063 A | * | 1/1967 | Kisling, III | ............. E21B 47/06 |
| | | | | 73/706 |
| 3,756,085 A | * | 9/1973 | Hunter | ................ G01L 19/0645 |
| | | | | 73/729.1 |

(Continued)

FOREIGN PATENT DOCUMENTS

| AU | 2014309299 B2 | 2/2017 |
| CA | 2389419 C | 2/2008 |

(Continued)

OTHER PUBLICATIONS

International Search Report and Written Opinion dated Nov. 19, 2020 in PCT/RU2020/000395 (7 pages).

(Continued)

*Primary Examiner* — Dominick L Plakkoottam
(74) *Attorney, Agent, or Firm* — Meunier Carlin & Curfman LLC

(57) ABSTRACT

Various implementations include electric centrifugal pump assemblies for producing oil from wells. A submersible electric motor includes a housing, a shaft inside said housing (Continued)

that transmits rotational power from the electric motor section to the pump section, a mechanical seal surrounding the shaft to keep a dielectric fluid inside the electric motor, and a unit for compensating the volume of the dielectric fluid. Said unit maintains a constant positive pressure and includes a spring mounted inside a metal bellows. The spring is arranged in a tensioned state inside a cavity containing dielectric fluid. The spring is rigidly fastened facing the electric motor and to the bottom of the bellows such as to be capable of axial movement. The volume compensation unit is provided with a sensor for sensing the position of the spring/bellows. The cavity is filled with a barrier fluid preventing scale build-up.

4 Claims, 4 Drawing Sheets

(51) Int. Cl.
*F04D 13/10* (2006.01)
*H02K 5/132* (2006.01)

(56) References Cited

U.S. PATENT DOCUMENTS

| | | | | |
|---|---|---|---|---|
| 3,916,130 | A * | 10/1975 | Cade | H01H 35/2671 |
| | | | | 73/302 |
| 3,947,709 | A * | 3/1976 | Waltman | H02K 5/132 |
| | | | | 367/172 |
| 4,421,999 | A * | 12/1983 | Beavers | F04D 13/10 |
| | | | | 310/87 |
| 5,796,197 | A * | 8/1998 | Bookout | H02K 5/132 |
| | | | | 310/85 |
| 7,654,315 | B2 * | 2/2010 | Du | E21B 4/003 |
| | | | | 166/66.4 |
| 9,528,357 | B2 | 12/2016 | Du et al. | |
| 9,528,368 | B2 * | 12/2016 | Semple | E21B 47/008 |
| 9,534,480 | B2 * | 1/2017 | Hendryx | F04D 13/10 |
| 9,631,725 | B2 * | 4/2017 | Semple | F16J 15/00 |
| 9,970,272 | B2 * | 5/2018 | Semple | F04D 29/086 |
| 10,125,759 | B2 * | 11/2018 | Pyron | F04B 17/03 |
| 10,344,751 | B2 * | 7/2019 | Roman | F04B 53/1002 |
| 11,268,518 | B2 * | 3/2022 | Semple | E21B 43/128 |
| 2011/0014071 | A1 | 1/2011 | Du et al. | |
| 2015/0052989 | A1 | 2/2015 | Semple et al. | |
| 2015/0132158 | A1 * | 5/2015 | Reeves | F04B 35/04 |
| | | | | 417/410.1 |
| 2015/0323130 | A1 * | 11/2015 | Meyer | F16N 17/00 |
| | | | | 184/6.1 |
| 2015/0337843 | A1 * | 11/2015 | Tanner | F04B 15/0005 |
| | | | | 417/423.3 |
| 2015/0354327 | A1 * | 12/2015 | Semple | E21B 43/128 |
| | | | | 166/62 |
| 2016/0017701 | A1 | 1/2016 | Tanner et al. | |
| 2017/0292342 | A1 * | 10/2017 | Reeves | F04B 53/008 |
| 2017/0306733 | A1 * | 10/2017 | Reeves | H02K 5/132 |
| 2018/0171766 | A1 * | 6/2018 | Clingman | E21B 4/003 |
| 2020/0095992 | A1 * | 3/2020 | Semple | F04D 29/128 |

FOREIGN PATENT DOCUMENTS

| | | | |
|---|---|---|---|
| FR | 2602551 A3 * | 2/1988 | |
| GB | 2379094 B | 7/2005 | |
| GB | 2534707 B | 7/2017 | |
| NO | 20160311 A1 | 2/2016 | |
| RU | 68801 U1 | 11/2007 | |
| RU | 2638492 C2 | 12/2017 | |
| WO | 2018111596 | 6/2018 | |

OTHER PUBLICATIONS

Russian Search Report issued in Application No. 2019124783/06 filed Jan. 21, 2020 (9 pages).
Decision to Grant a patent dated Jun. 15, 2020, for Russian Patent Application No. 2019124783/12 (12 pages).

\* cited by examiner

SUBMERSIBLE ELECTRIC MOTOR WITH A SYSTEM FOR MAINTAINING A CONSTANT POSITIVE PRESSURE

CROSS REFERENCE TO RELATED APPLICATION

This application is a national stage application filed under 35 U.S.C. § 371 of PCT/RU2020/000395 filed Jul. 27, 2020, which claims the benefit of Russian Patent Application No. 2019124783 filed Aug. 1, 2019, the content of which is incorporated herein by reference in its entirety.

FIELD OF THE INVENTION

The invention relates to oil industry and can be used in electric submersible pumping systems (ESP systems) for oil production.

BACKGROUND OF THE INVENTION

Known from the state of the art is a submersible electric motor (the motor) for an ESP system with a seal section; the motor having a system for maintaining constant positive pressure and comprising an outer housing, a shaft, a seal radially surrounding the shaft, a reservoir mounted above the seal and containing barrier fluid with density greater than the water density, metal bellows arranged one inside the other with a heavy load or a spring arranged between them, the bellows providing a positive pressure within the motor cavity [U.S. Pat. No. 9,631,725B2]. The disadvantage of the prior art motor is the need to use a special reservoir for the barrier fluid. Furthermore, the restriction on the barrier fluid density eliminates the possibility of using, e.g., demulsifiers with a density lower than the water density to reduce the risk of asphaltene deposition. The use of a load in the system for creating positive pressure precludes the operation of the motor in horizontal wells, and the use of a spring located in the well fluid medium between the outer and inner bellows may be accompanied by a change in the properties of the spring due to the effect of the well fluid, e.g., causing metal corrosion, and consequently elasticity loss, which will negatively affect the process of maintaining positive pressure.

Known from the state of the art are submersible electric motors with a system for maintaining constant positive pressure, wherein the seal section comprises a system for monitoring the operating conditions of metal bellows containing one or more pressure sensors determining differential pressure on the metal bellows by converting pressure into an electrical signal [U.S. Pat. No. 9,528,368B2; GB2534707; AU2014309299; N020160311].

The disadvantages of the motors with the above system include insufficient reliability of the differential pressure sensor, in case of failure of which the ability to regulate the pressure value within the ranges ensuring tightness of the motor connection is lost, which would lead to the ingress of well fluid into the motor cavity.

The closest prior art to the present invention in terms of the combination of features is a submersible electric motor with a system for maintaining constant positive pressure; the motor comprising a housing, a shaft arranged to rotate inside the housing and transmit rotational power from the electric motor to the pump, a shaft seal radially surrounding the shaft and keeping the dielectric fluid within the electric motor, a volume compensation unit for compensating the volume of a dielectric fluid with a system for maintaining constant positive pressure arranged therein, the unit comprising a metal bellows assembly providing positive pressure within the electric motor relative to the pressure of the well fluid flowing around it, and at least one bellows movement stop, wherein the system for maintaining positive pressure is provided with a spring arranged within the metal bellows in a tension (compressed) state, the shaft being surrounded by two or more sequentially arranged shaft seals forming a cavity between seals [U.S. Pat. No. 9,528,357B2 or CA2389419C or GB2379094B]. The lower end of the stretched spring is rigidly attached to the partition above the formation fluid, and the upper end attached to the bellows moves in the axial direction and stretches the bellows. The bellows assembly comprises two types of bellows of different radial dimensions.

The disadvantage of the closest prior art is the use of fixed stops limiting the movement of the bellows during the expansion of the bellows assembly. When the bellows reach the maximum position and abut the stop, the pressure drop across the bellows assembly may exceed the initial calculated pressure, and further expansion of the dielectric fluid filling the electric motor combined with the limited axial dimensions of the bellows may cause the pressure drop between the bellows cavity and the well fluid to exceed the maximum possible pressure drop in terms of strength properties, which can lead to deformation and rupture of the bellows, and consequently cause the ingress of well fluid into the motor cavity. Furthermore, the inner cavity of the spring communicates with the annular space, and, therefore, it can be affected by well fluid and changes in the properties of the spring, e.g., metal corrosion and consequent elasticity loss, which would negatively affect the process of maintaining positive pressure.

Another disadvantage of the closest prior art is the absence of a system for monitoring the bellows position, which limits the possibility of adjusting the parameters of the assembly and the motor on the surface in order to optimize the operation of the system or obtain comprehensive information regarding the cause of the failure

SUMMARY OF THE INVENTION

The objectives of the present invention are: preventing the ingress of well fluid into the cavity of a submersible electric motor during the entire operating period, providing monitoring of the system for maintaining positive pressure, enhancing the reliability of the submersible electric motor and increasing the mean time to failure.

The objectives are achieved by a submersible electric motor with a system for maintaining constant positive pressure, the motor comprising an outer housing, a shaft arranged to rotate inside the housing and transmit rotational power from the electric motor to the pump, two or more shaft seals arranges in series forming a cavity between the seals or one shaft seal, the shaft seals are arranged to radially surround the shaft to keep the dielectric fluid within the electric motor; a volume compensation unit for compensating the volume of the dielectric fluid with a system for maintaining constant positive pressure disposed therein, the system comprising at least one metal bellows and a spring in a tension state arranged therein; according to the invention, the spring is arranged in a stretched state within the cavity with the dielectric fluid, the upper end of the spring is rigidly fixed on the side faced to the electric motor, and the lower end of the spring is attached to the bottom of the bellows such as to be capable of axial movement; the volume compensation unit is provided with the spring/bellows position sensor, the cavity between the shaft seals is filled with a barrier fluid preventing scale build-up when the dielectric fluid of the electric motor contacts the well fluid.

An elastic member filled with a protective fluid can be arranged in the lower part of the electric motor, the protective fluid prevents scale build-up on the surface of the metal bellows when the dielectric fluid of the electric motor contacts the well fluid.

In order to increase the reliability of the bellows operation, a coaxial guide rod can be mounted within the compensation unit.

In embodiments with three or more shaft seals, they respectively form two or more cavities, and a metal bellows can be mounted in each cavity between the shaft seals.

The protective fluid filling the elastic member protects the surface of the metal bellows from the upward flow of the well fluid, as when the protective fluid contacts the well fluid, the surface of the metal bellows is not subjected to corrosion or scale build-up.

To improve reliability of the volume compensation unit, it is preferable to install in it two or more metal bellows sequentially with a spring in each bellows.

BRIEF DESCRIPTION OF THE DRAWINGS

The present invention will be understood more fully from the detailed description given below and from the accompanying drawings of the preferred embodiments of the invention. In the drawings.

DETAILED DESCRIPTION OF THE INVENTION

Figure 1:
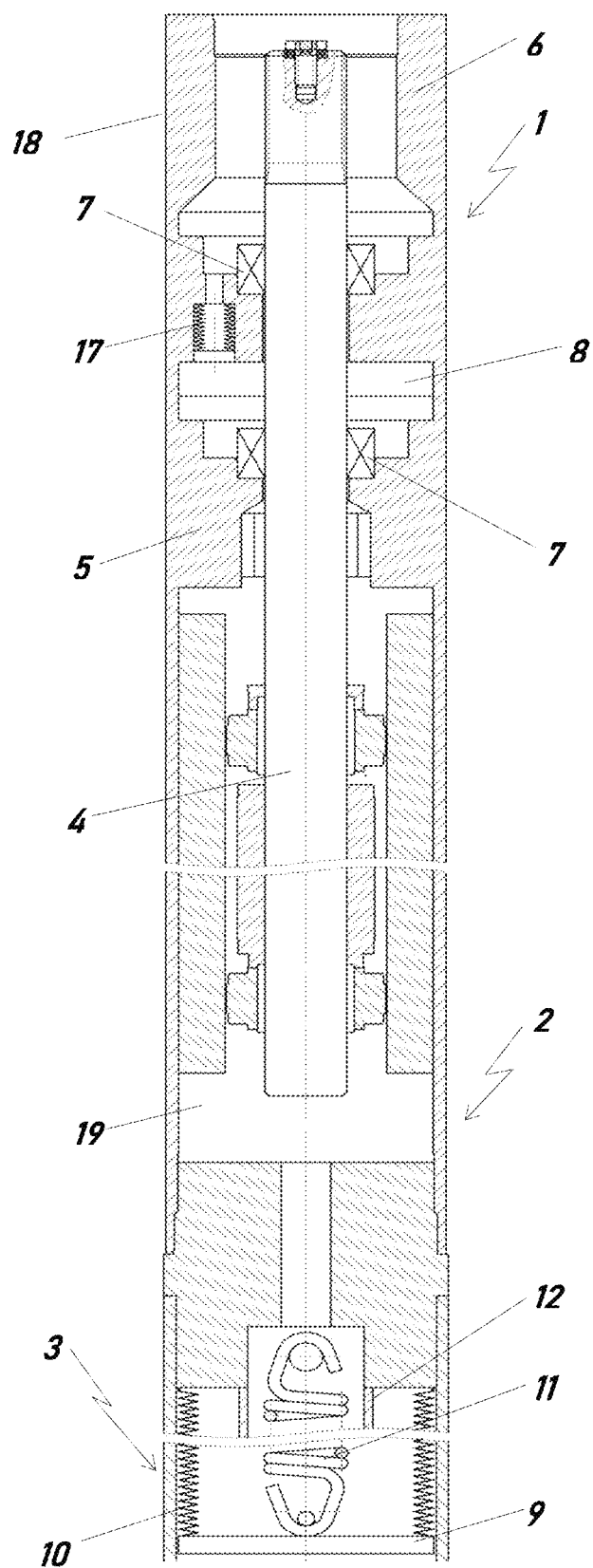
FIG. 1 shows the disclosed submersible electric motor with a system for maintaining constant positive pressure.

A submersible electric motor 2 with a system for maintaining constant positive pressure is provided with a housing 18, a protector 1 on top, and a compensation unit 3 is attached thereto from below (FIG. 1). The protector 1 comprises a shaft 4, a base 5, a head 6, and upper and lower shaft seals 7. A cavity 8 is formed around the shaft 4 between the lower and upper shaft seals 7. The cavity 8 can be filled with both a dielectric fluid and a barrier fluid provided in order to reduce the probability of scale build-up on the outer surface of the upper shaft seal 7 which could lead to premature failure of the seal. A demulsifier can be used as a barrier fluid, preventing the deposition of asphaltenes when the dielectric fluid of the electric motor contacts the well fluid, as well as a fluid having density higher than the well fluid density, which will prevent the latter from entering the underlying cavity of the motor 2 under the action of gravity, even if it penetrates through the upper shaft seal and enters the cavity 8.

Figure 3:
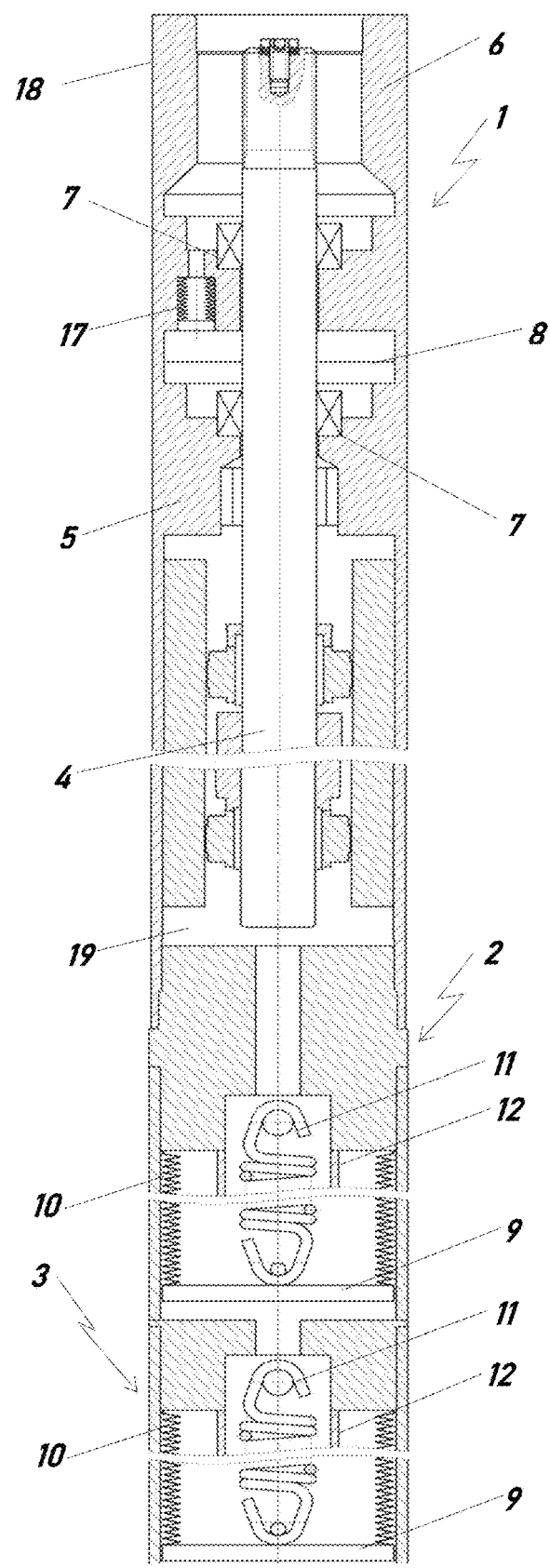
FIGS. 3 and 4 show embodiments of the submersible electric motor.

The cavity 19 of the motor 2 is filled with a dielectric fluid and is in fluid communication with the compensation unit 3. The system for maintaining a constant positive pressure arranged within the compensation unit 3 and surrounded by the dielectric fluid comprises a metal bellows with a bottom 9 at the movable lower end and a spring 11 mounted therein in a stretched state and oriented along the shaft 4 axis. The lower end of the spring 11 is connected with the movable bottom 9 of the metal bellows 10 and is configured for axial movement, while the upper end is rigidly attached facing the electric motor. The metal bellows 10 and the spring 11 are arranged in a tensioned (stretched) state, thus allowing to create an excess pressure in the cavity 19 of the motor 2 with a dielectric fluid. To increase the reliability of the compensation unit 3 and to provide operational monitoring of the pressure value therein, two or more metal bellows 10 can be sequentially mounted, wherein each bellows must be provided with a spring to create positive pressure in case any of the bellows break or lose leak-tightness (FIG. 3).

A spring/bellows position sensor 12 is arranged within the compensation unit 3 and connected with the surface equipment for transmitting the readings. The bellows 10 position sensor 12 can be any sensor that registers the tension of the spring, e.g., an inductive sensor or a strain-gage sensor. The inductive sensor can be a coil arranged around a core; such a coil can be the spring 11, the inductance of which varies depending on its compression/expansion degree.

Figure 2:
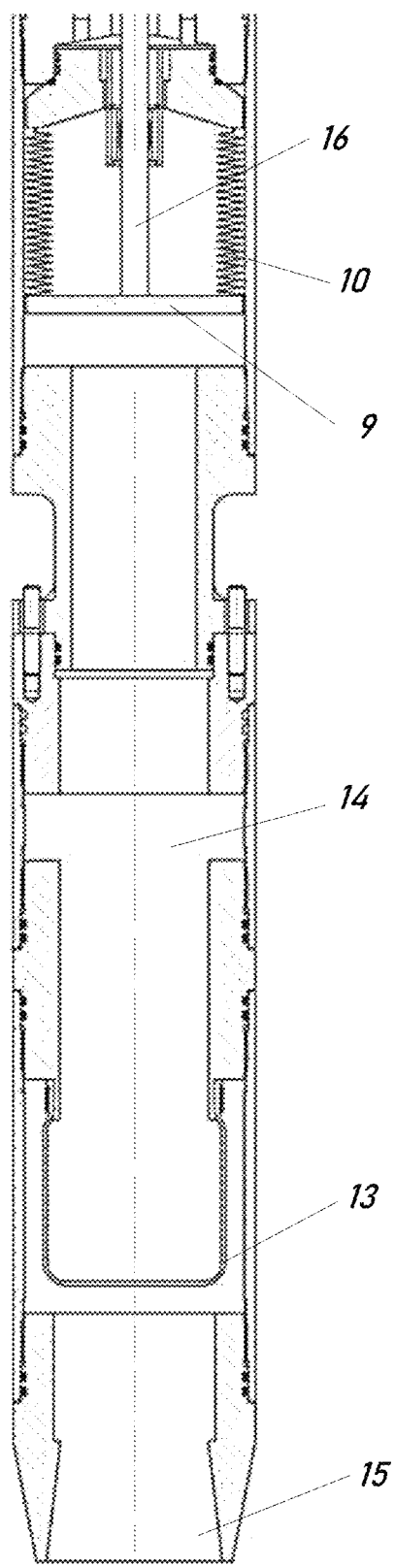
FIG. 2 shows a part of the lower part of the motor with an elastic member.

In the lower part of the motor 2, an elastic member 13 in the form of a elastomer bag can be further arranged, the elastic member filled with a protective fluid 14, e.g., a demulsifier (FIG. 2). The protective fluid 14 protects the metal bellows 10 from the ingress of well fluid 15 from below and from subsequent deposition of impurities contained in the well fluid on its outer surface, e.g., in the form of asphaltenes. Besides the demulsifier, another fluid with a density lower than the well fluid density can be used as a protective fluid 14, in which case the heavier well fluid below will not be able to rise to the surface of the metal bellows 10 in the event of damage to the elastic member 13.

Within the compensation unit 3 in the vicinity of the metal bellows 10, a coaxial guide rod 16 can be mounted, the rod preventing bending deformations of the metal bellows 10.

Figure 4:
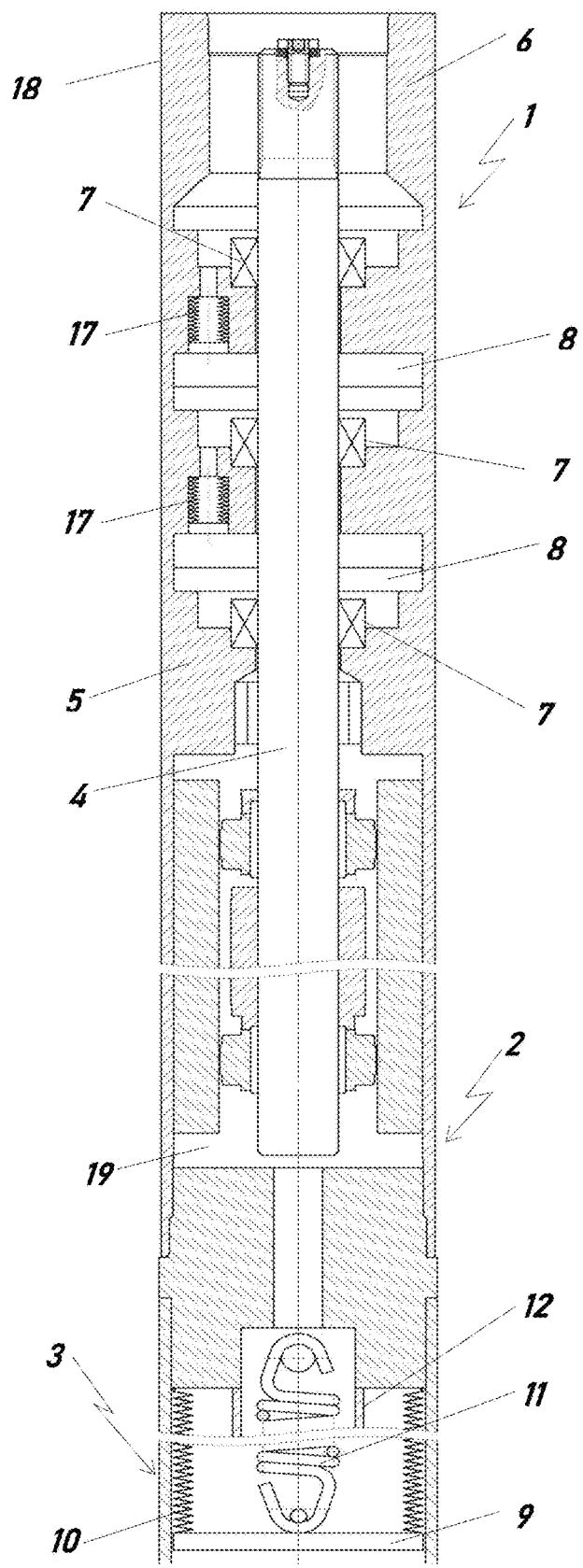

To increase the reliability of the protector 1, the number of the shaft seals 7 mounted on the shaft 4 can be more than two, thus forming additional cavities 8 therebetween. To compensate for the change in volume of the fluid in the protector 1, a metal bellows 17 can be installed between each pair of the shaft seals 7, the bellows being in fluid communication with the cavity 8 (FIG. 4). The present submersible electric motor with a system for maintaining constant positive pressure operates as follows.

When the assembly is lowered into the well and during its operation, the temperature of the electric motor 2 starts to increase and the dielectric fluid in its cavity 19 expands. The compensation unit 3 arranged in the lower part of the electric motor 2 compensates for the temperature changes in the volume of the dielectric fluid in the cavity 19 of the electric motor 2 by expanding or contracting the bellows 10 and equalizes the pressure difference between the dielectric fluid within and the well fluid flowing around the electric motor outside. In this case, due to the initially tensioned state of the bellows, at any position thereof within the cavity 19 of the electric motor 2, excessive pressure is created, due to which the formation fluid does not ingress into the cavity 19 of the electric motor 2. The presence of coaxial guide rod 16 eliminating the bending of the bellows 10 within the compensation unit 3 provides the bellows movement strictly in the axial direction, thereby increasing the reliability of the compensation unit. Shaft seals 7 closing the radial space around the shaft 4 in the upper part of the protector 1 prevent the passage of well fluid from the annular space, thus protecting the inner cavity 19 of the motor 2 from the ingress of well fluid.

Nevertheless, during operation of the assembly and the electric motor 2, it is possible that well fluid, together with solid particles suspended in it, enters the shaft seal 7. Thus, the shaft seal 7 wears out and loses its sealing ability over time. The probability of particles getting into the shaft seal 7 increases during stops in operation of the electric submersible pumping system when a pressure change occurs within the cavity 19 of the motor 2. At this time, the metal bellows 10 and the spring 11 of the system for maintaining constant positive pressure in the compensation unit 3, being in a tensioned state, generate an excessive constant pressure in the cavity 19 of the electric motor 2. The excessive pressure value is monitored based on the readings of the sensor 12 which transmits data on the position of the bellows 10 and the spring 11 to the surface, e.g., via a telemetry system. The excessive pressure generation within the entire cavity 19 of the motor 2 and respectively on the inner side of the shaft seal 7 forces the fluid flow to move in only one direction: from the cavity 19 of the electric motor 2 into the well fluid, eliminating the possibility of counter-flow of the well fluid into the cavity 19 of the electric motor.

During operation, the sensor 12 determines the position of the bellows 10 and the spring 11 and transmits the readings to the surface, e.g., via a telemetry system, thus allowing to determine the operational state of the system for maintaining positive pressure on the surface.

In an example embodiment of the present invention, the initial positions of the bellows 10 and the spring 11 are set so that the system for maintaining constant positive pressure provides an excessive pressure of 2 atm at a temperature of the motor winding of 180° C. The value of the spring 11 initial tension and the dielectric fluid volume required to fill the cavity 19 of the motor 2 are determined by calculation, taking into account possible leaks so that this dielectric fluid volume is sufficient for the entire specified period of operation of the electric submersible pumping system. For this purpose, firstly, it is necessary to set the expected operational period of the assembly and the motor 2. By selecting the stiffness and geometric dimensions of the spring 11, an accurate setting of the specified excessive pressure value within the compensation unit 3 is achieved. At the same time, the amount of possible leakage through the shaft seals 7 is also taken into account by studying (or calculating) the change in the amount of leakage over time relative to the amount of pressure drop in the system for maintaining positive pressure. Assume that the total integral value of leakage through the shaft seal is 3 liters when the pressure drop changes from 2 to 1 atm, and the volume of the dielectric fluid within the motor at the final compressed spring position is 5 liters. In that case, the total volume of the dielectric fluid for filling the cavity 19 of the motor 2 should be 8 liters. Based on the initial volume of 8 liters and the bellows position, the spring geometric dimensions and stiffness are determined so that at the initial moment a pressure of 2 atm is created in the positive pressure system.

The spring within the cavity of the submersible motor provides a constant positive pressure within the cavity relative to the pressure of the well fluid, thus preventing the ingress of well fluid into the cavity of the submersible motor during its entire operating period. By placing the spring within the dielectric fluid, corrosion and wear thereof are prevented due to lack of contact with corrosive well fluid. The bellows position sensor provides monitoring over operation of the system for maintaining positive pressure. As a result, average operating period and reliability of the submersible electric motor, and, consequently, of the entire electric submersible pumping system, are increased.

The invention claimed is:

1. A submersible electric motor with a system for maintaining constant positive pressure, the electric motor comprising a housing, a shaft arranged to rotate inside the housing and transmit rotational power from the electric motor to a pump; two or more sequentially arranged shaft seals forming a first cavity between the shaft seals, the shaft seals are arranged to radially surround the shaft to keep a dielectric fluid within the electric motor; a volume compensation unit for compensating the volume of the dielectric fluid with the system for maintaining constant positive pressure disposed therein, the system comprises at least one metal bellows and a spring in a tensioned state arranged therein, the submersible electric motor is characterized in that the spring is arranged in a stretched state within a second cavity of the electric motor with the dielectric fluid, an upper end of the spring is rigidly fixed on a side facing the electric motor, and a lower end of the spring is attached to a bottom of the at least one metal bellows such as to be capable of axial movement; the volume compensation unit is provided with a spring/bellows position sensor, the first cavity between the shaft seals is filled with a barrier fluid preventing scale build-up when the dielectric fluid of the electric motor contacts a well fluid, wherein an elastic member filled with a protective fluid is arranged in a lower part of the electric motor, the protective fluid prevents scale build-up on a surface of the at least one metal bellows when the dielectric fluid of the electric motor contacts the well fluid.

2. The submersible electric motor according to claim 1, characterized in that a guide rod is mounted coaxially within the volume compensation unit.

3. The submersible electric motor according to claim 1, wherein the motor is characterized in that each pair of the two or more sequentially arranged shaft seals comprises a first metal bellows amounted between said each pair of the shaft seals, wherein the first metal bellows is in fluid communication with the first cavity between the respective shaft seals.

4. The submersible electric motor according to claim 1, wherein the at least one metal bellows comprises a second metal bellows disposed within the second cavity of the electric motor, the motor characterized in that two or more of the at least one metal bellows are mounted sequentially in the volume compensation unit, including the second metal bellows provided in the second cavity of the motor and provided with the spring.

* * * * *